(12) United States Patent
Hacklberger et al.

(10) Patent No.: US 10,900,527 B2
(45) Date of Patent: Jan. 26, 2021

(54) DISK BRAKE FOR A UTILITY VEHICLE

(71) Applicant: KNORR-BREMSE Systeme fuer Nutzfahrzeuge GmbH, Munich (DE)

(72) Inventors: Michael Hacklberger, Neuburg am Inn (DE); Markus Molnar, Fuerstenzell (DE); Christoph Kaiser, Aidenbach (DE); Alexander Asen, Eichendorf (DE); Jens Fricke, Vilshofen (DE); Dimitrij Habermann, Stephansposching (DE); Werner Koch, Deggingen (DE); Igor Nesmjanowitsch, Hengersberg (DE); Tobias Schoefberger, Mainburg (DE); Christian Stoeger, Osterhofen (DE); Alexander Werth, Munich (DE); Philipp Krauss, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 153 days.

(21) Appl. No.: 15/971,632

(22) Filed: May 4, 2018

(65) Prior Publication Data
US 2018/0347651 A1 Dec. 6, 2018

Related U.S. Application Data

(63) Continuation of application No. PCT/EP2016/069408, filed on Aug. 16, 2016.

(30) Foreign Application Priority Data

Nov. 5, 2015 (DE) .................... 10 2015 119 048

(51) Int. Cl.
*F16D 55/2265* (2006.01)
*F16D 55/227* (2006.01)
(Continued)

(52) U.S. Cl.
CPC ...... *F16D 55/22655* (2013.01); *F16C 33/122* (2013.01); *F16C 33/20* (2013.01);
(Continued)

(58) Field of Classification Search
CPC ............. F16D 55/22655; F16D 55/227; F16D 65/0087; F16D 2055/0008; F16D 2055/007; F16C 33/20; F16C 33/122; F16C 2361/45
(Continued)

(56) References Cited

U.S. PATENT DOCUMENTS 4,084,666 A * 4/1978 Karasudani ......... F16D 55/2265
188/73.45
4,334,599 A * 6/1982 Ritsema ............ F16D 55/22655
188/73.45
(Continued)

FOREIGN PATENT DOCUMENTS

CN 101422896 A 5/2009
CN 201428754 Y 3/2010
(Continued)

OTHER PUBLICATIONS

English machined translation of CN-203962642, Nov. 26, 2014 (description only).*
(Continued)

*Primary Examiner* — Robert A. Siconolfi
*Assistant Examiner* — San M Aung
(74) *Attorney, Agent, or Firm* — Crowell & Moring LLP

(57) ABSTRACT

The invention relates to a disk brake for a utility vehicle, comprising a brake caliper, which extends over a brake disk and which is slidably held on at least one guide bar, which is connected to a stationary brake bracket by means of a screw, wherein the screw is fed through the guide bar, is designed in such a way that the guide bar has impressing (Continued)

elements, which are formed on the end face of the guide bar that lies against the brake bracket, at least in a circumferential and/or radial partial region, which impressing elements engage into the brake bracket in an impressed manner in such a way that an interlocking connection and/or a frictional connection is formed.

27 Claims, 22 Drawing Sheets

(51) Int. Cl.
F16D 65/00 (2006.01)
F16C 33/12 (2006.01)
F16C 33/20 (2006.01)
F16D 55/00 (2006.01)

(52) U.S. Cl.
CPC ....... *F16D 55/227* (2013.01); *F16D 65/0087* (2013.01); *F16C 2361/45* (2013.01); *F16D 2055/007* (2013.01); *F16D 2055/0008* (2013.01)

(58) Field of Classification Search
USPC ......... 188/73.45, 73.31; 403/90, 408, 408.1; 411/367, 537
See application file for complete search history.

(56) References Cited

U.S. PATENT DOCUMENTS

| | | | | |
|---|---|---|---|---|
| 2007/0284198 | A1* | 12/2007 | Salapic | F16D 55/227 188/73.45 |
| 2009/0260928 | A1* | 10/2009 | Baumgartner | F16D 55/22655 188/73.44 |
| 2013/0126280 | A1 | 5/2013 | Gutelius | |
| 2014/0003747 | A1 | 1/2014 | Schneider et al. | |
| 2016/0356325 | A1* | 12/2016 | Knoop | F16D 55/22655 |

FOREIGN PATENT DOCUMENTS

| | | | |
|---|---|---|---|
| CN | 202431699 U | | 9/2012 |
| CN | 103429918 A | | 12/2013 |
| CN | 203962642 | * | 11/2014 |
| CN | 203962642 U | | 11/2014 |
| CN | 204094815 U | | 1/2015 |
| CN | 204332346 U | | 5/2015 |
| DE | 10 2013 114 899 A1 | | 7/2015 |
| EP | 0 046 432 A2 | | 2/1982 |
| EP | 3 101 301 A1 | | 12/2016 |
| WO | WO 2014/020941 A1 | | 2/2014 |

OTHER PUBLICATIONS

Chinese-language Office Action issued in counterpart Chinese Application No. 201680076301.X dated Mar. 28, 2019 with English translation (12 pages).

International Search Report (PCT/ISA/210) issued in PCT Application No. PCT/EP2016/069408 dated Oct. 25, 2016 with English-language translation (Six (6) pages).

German-language Written Opinion (PCT/ISA/237) issued in PCT Application No. PCT/EP2016/069408 dated Oct. 25, 2016 (Five (5) pages).

Chinese-language Office Action issued in counterpart Chinese Application No. 201680076301.X dated Nov. 4, 2019 with partial English translation (12 pages).

German-language European Office Action issued in counterpart European Application No. 16751599.8 dated Oct. 23, 2019 (five (5) pages).

* cited by examiner

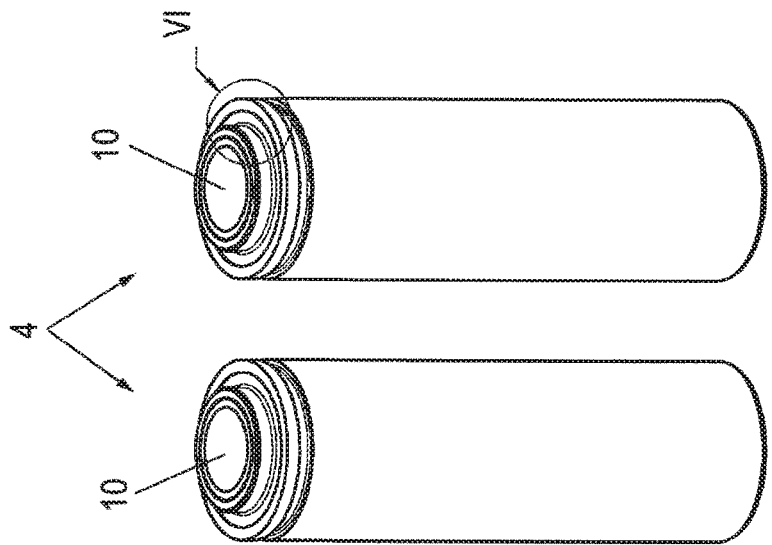
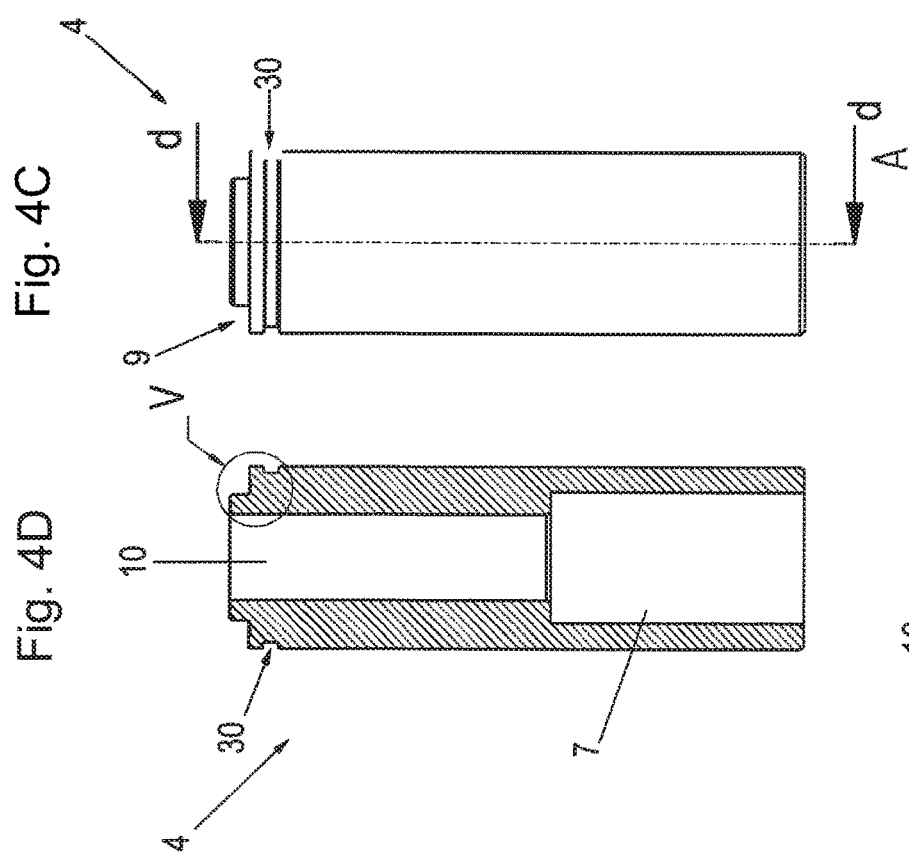
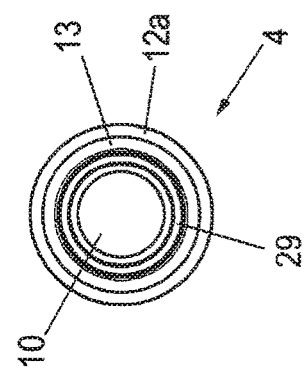

DISK BRAKE FOR A UTILITY VEHICLE

CROSS REFERENCE TO RELATED APPLICATIONS

This application is a continuation of PCT International Application No. PCT/EP2016/069408, filed Aug. 16, 2016, which claims priority under 35 U.S.C. § 119 from German Patent Application No. 10 2015 119 048.6, filed Nov. 5, 2015, the entire disclosures of which are herein expressly incorporated by reference.

BACKGROUND AND SUMMARY OF THE INVENTION

The invention relates to a disc brake for a utility vehicle.

In such a disc brake, also known as a sliding caliper-disc brake, the brake caliper is held in an axially displaceable manner by guide bars relative to a brake disc, wherein the guide bars in each case form an axial slide bearing in correspondence with slide bushings of the brake caliper.

The guide bars are fastened to a brake carrier, which is stationary relative to the brake caliper, by a screw which is guided through a bore of the guide bar. In this case, the screw is supported with its head on the bottom of a counterbore of the guide bar and at the same time is screwed with its threaded shank into the brake carrier.

The guide bar bears with a front face against the assigned surface of the brake carrier, wherein a high-strength expanding screw is used as the screw, which by pretensioning presses the guide bar against the brake carrier.

During operation, deformations may result in the connecting region of the guide bars on the brake carrier, whereby bending moments act, said bending moments impairing the axial pretensioning of the screw connection to such an extent that said screw connection is no longer sufficient in order to hold the guide bar securely on the brake carrier. Consequently, there is the risk of the guide bar twisting relative to the brake carrier, as a result of which the axial pretensioning force is reduced and the screw connection is loosened.

Attempts have already been made to prevent a loosening of the screw, namely by securing elements, for example a washer which is arranged between the screw head and the counterbore of the guide bar, but it has been proven that during operation the guide bar is initially loosened in the region of the interface with the brake carrier.

The use of securing elements in the form of serrated lock washers, toothed lock washers, clamping plates or the like is also not suitable for providing sufficient securing, particularly as the front face of the guide bar is hardened.

The problem of the loosening of the connection of the guide bar with the brake carrier also occurs when the surface of the brake carrier facing the guide bar is provided with a coating which reduces the friction coefficient, for example consisting of zinc phosphate.

Due to the reduced frictional connection between the guide bar and the brake carrier, there is an increased risk of the twisting of the guide bar which, as mentioned above, may lead to a loss of the pretensioning force of the screw with the risk of a total malfunction of the brake, albeit at least with the restricted functionality thereof.

In principle, a disc brake constitutes a safety-relevant component so that the described potential risk of the loosening of the guide bar and ultimately of the brake caliper requires shorter service intervals for the monitoring thereof.

The object of the invention is to develop a disc brake of the generic type, such that the functional and operational safety thereof is improved with low constructional effort.

A first design variant of a disc brake according to the invention for a commercial vehicle has a brake calliper which engages over a brake disc and is held displaceably on at least one guide bar which is connected by a bolt to a stationary brake carrier. The bolt is guided through the guide bar. On its end face which bears against the brake carrier, the guide bar has impressing elements which are integrally formed at least in circumferential and/or radial part region and engage into the brake carrier in an impressed manner with the formation of a positively locking connection and/or a frictionally locking connection.

As an alternative or in addition, a bearing face of the brake carrier, against which bearing face the end face of the guide bar bears, has impressing elements which are integrally formed at least in circumferential and/or radial part region and engage into the end face of the guide bar in an impressed manner with the formation of a positively locking connection and/or a frictionally locking connection.

In a second design variant of a disc brake according to the invention, the guide bar has a projection which is received fixedly in a recess, adapted to the projection, of the brake carrier so as to rotate with it, with the formation of a positively locking connection.

In a third design variant of a disc brake according to the invention, that end face of the guide bar which bears against the brake carrier and a recess of the brake carrier are of cone envelope-shaped configuration for receiving at least the end face of the guide bar.

With the embodiment of the disc brake according to the invention, a securing of the guide bar is achieved which is independent of the coating of the adjacent surfaces of the guide bar, on the one hand, and of the brake carrier, on the other hand, and by which the pretensioning of the screw remains unaltered even when bending loads act on the guide bar during operation, in particular by the described deformations due to the prevailing loads. In any case, it is possible to eliminate that the screw connection is released, whereby the problems described relative to the prior art do not occur.

The impressing elements on the front face of the guide bar, which according to the invention are configured at least in a circumferential and/or radial partial region of the front face, may preferably be present as a toothing, preferably as crown gear teeth or knurling, incorporated before the guide bar is hardened in this region.

Accordingly, in this respect the brake carrier on the contact side with the guide bar is untreated and/or unmachined, i.e. the material of the brake carrier is markedly softer than the hardened material of the guide bar. Thus the impressing elements on the front face and/or the formed teeth, edges or points of the guide bar are impressed into the opposing abutment surface of the brake carrier by the screw pressure when the screw connection is created, so that according to the invention a positive connection and/or a frictional connection is produced.

The impressing elements in a radial partial region of the front surface may be present in a circumferential inner and/or outer circular ring, wherein a planar surface is configured adjacent thereto, said planar surface being raised or recessed relative to the impressing elements in the axial direction, i.e. in this case the impressing elements protrude relative to the planar surface. In a preferred embodiment, the impressing elements are present in the outer circular ring.

It is also conceivable to configure circumferential partial regions of the front face in segment regions alternately as planar surfaces or to provide them with impressing elements, wherein preferably the segment regions are arranged at the same angular spacing from one another. Here, at least three segment regions are provided in each case, i.e. three segment regions are configured as planar surfaces and in each case one segment region with impressing elements is provided between two such planar surfaces.

This planar surface ensures and/or these planar surfaces ensure a precise right-angled positioning of the guide bar relative to the brake carrier and this ultimately determines the penetration depth of the impressing elements since these impressing elements are pushed into the bearing surface of the brake carrier sufficiently far until the planar surface of the guide bar bears against the brake carrier.

The impressing elements as three-dimensional structures may be produced via different methods. For example, rolling, knurling, milling, pressing, hobbing, drawing, cutting, deep-drawing, lasering, eroding, impressing or radiating might be cited here. With the exception of the radiating, a defined structure is produced. During radiation, however, due to the abrasive, in particular angular, granulate a high level of roughness may be produced, the points thereof constituting the impressing elements.

The impressing elements which are present in an ordered structure may be produced by knurling with radially extending serrations, left-hand knurling, right-hand knurling, left-right knurling with raised points (fish skin), left-right knurling with recessed points, cross knurling with raised points or cross knurling with recessed points. In different regions, the impressing elements may be structured differently, wherein serrations may have an asymmetrical notch geometry.

As mentioned, the impressing elements are produced before the hardening of the guide bar, including the front face. This may take place by material-removing machining. The number and shape of the impressing elements is able to be determined according to the prevailing load and the respective application, wherein the height of the impressing elements may be the same size or different.

For producing the guide bar, in a first method step the through-bore for receiving the screw is introduced by boring or milling. Preferably, this takes place in one step by a stepped drill. In a subsequent method step, the external contour of the guide bar is produced by removing material, in particular by turning, wherein the dimensional stability of the front face is produced.

This front face initially extends over the entire surface area of the front face which forms an external ring and which is subsequently machined such that firstly it has the profile of the impressing elements and secondly it forms the planar surface.

After this material-removing machining by turning, the introduction of the profile of the impressing elements takes place, for example with a rotating, in particular cylindrical, tool, for example a knurling tool. Subsequently, the hardening of the guide bar takes place at least in the front side region comprising the impressing elements.

Alternatively, the cylindrical outer surface, i.e. the envelope surface of the guide bar, for example, is inductively hardened. In a further alternative embodiment, the guide bar or the front face of the guide bar, for example, may be case-hardened or press-hardened.

Production of the guide bar and the impressing elements by way of production methods without the removal of material, for example by way of reshaping (the latter, for example, by way of cold extrusion or the like), is also conceivable.

The invention is additionally characterized by its cost-effective implementation, namely no further components are required for securing the guide bar in accordance with numerous alternative embodiments of the invention. In this case, particular measures for adaptation are also not necessary, in particular not on the brake carrier which is able to remain unaltered relative to one which is already in use. This means that, for example during servicing and/or repair works, the new guide bar may be replaced by one which is available without specific measures having to be taken therefor.

In one development of the abovementioned second design variant of a disc brake according to the invention, in which the guide bar has a projection which is received fixedly in a recess, adapted to the projection, of the brake carrier so as to rotate with it, with the formation of a positively locking connection, a circumferential outer face of the projection of the guide bar and a circumferential inner face of the recess of the brake carrier are of polygonal configuration, for example as a rectangle or hexagon.

In a further alternative design variant, the circumferential outer face of the projection and a circumferential inner face of the recess of the brake carrier are of part-annular configuration. Here, a segment of the circumferential outer face of the projection and a segment of the circumferential inner face of the recess of the brake carrier are particularly preferably formed in a flattened manner as what are known as a key face.

Rotationally fixed securing of the guide bar relative to the brake carrier is likewise achieved in a simple manner by way of the positively locking receiving of the projection in the brake carrier.

According to another alternative design variant, an anti-rotation securing ring which lies on the brake carrier is placed on a projection which is configured with a flattened segment, instead of the recess of the brake carrier for receiving the projection of the guide bar. The anti-rotation securing ring has a bore which extends parallel to the bolt and in which a pin which secures the anti-rotation securing ring against rotation relative to the brake carrier is received. The pin extends into a corresponding bore in the brake carrier.

This design variant is distinguished by the fact that merely a bore for receiving the pin has to be made on the brake carrier, in order in this way to achieve rotationally fixed securing of the guide bar relative to the brake carrier.

According to a further preferred design variant, a segment of the circumferential outer face of the projection and segment of the circumferential inner face of the recess of the brake carrier are provided with a receptacle, into which a feather key is inserted.

It is also conceivable, for anti-rotation safeguard purposes, to integrally form impressing elements on at least one part region of the circumferential outer face of the projection, which impressing elements engage into the brake carrier in an impressed manner with the formation of a positively locking connection and/or a frictionally locking connection. Here, the impressing elements are particularly preferably configured as a knurled portion or a toothed portion.

In relation to the abovementioned third design variant of a disc brake according to the invention, in which an end face, bearing against the brake carrier, of the guide bar and a recess of the brake carrier for receiving at least the end face of the guide bar are of cone envelope-shaped configuration, the end face of the guide bar is preferably configured so as to rise toward the bolt.

Improved centring of the guide bar is achieved as a result, and an increase in the supporting area of the end face of the guide bar on the brake carrier.

As an alternative, the end face of the guide bar is configured so as to fall toward the bolt. Secure resting of an outer edge of the guide bar on the surface of the brake carrier is ensured as a result.

As an alternative or in addition, it is conceivable to adhesively bond the guide bar and/or the bolt to the brake carrier.

As an alternative or in addition, it is conceivable, furthermore, to provide the guide bar with a diamond spray coating on its end face which bears against the brake carrier, in order to further increase the coefficient of friction between the guide bar and the brake carrier.

According to a further preferred design variant, a sliding ring is arranged between a bolt head of the bolt and a supporting face of the bolt head in the guide bar in order to prevent the guide bar being released from the brake carrier.

As a result, a rotation of the guide bar is made possible, without releasing the bolt from the brake carrier.

In another alternative design variant, the bore in the guide bar, in which the bolt is received, is displaced eccentrically with respect to the rotational axis of the guide bar in order to prevent the bolt being released. Here, the distance between the two axes is preferably more than 1.5 mm, particularly preferably more than 3 mm.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 4A-E show different illustrations of an embodiment of a guide bar in accordance with the present invention of the disc brake before the introduction of the impressing elements.

DETAILED DESCRIPTION OF THE DRAWINGS

In the following description of the figures, expressions such as top, bottom, left, right, front, rear, etc. relate exclusively to the exemplary illustration and position, selected in the respective figures, of the disc brake, of the brake carrier, of the guide bar, of the impressing elements and of the like. Said expressions are not to be understood to be restrictive, that is to say said references can change as a result of different operating positions or the mirror-symmetrical design or the like.

Figure 1:
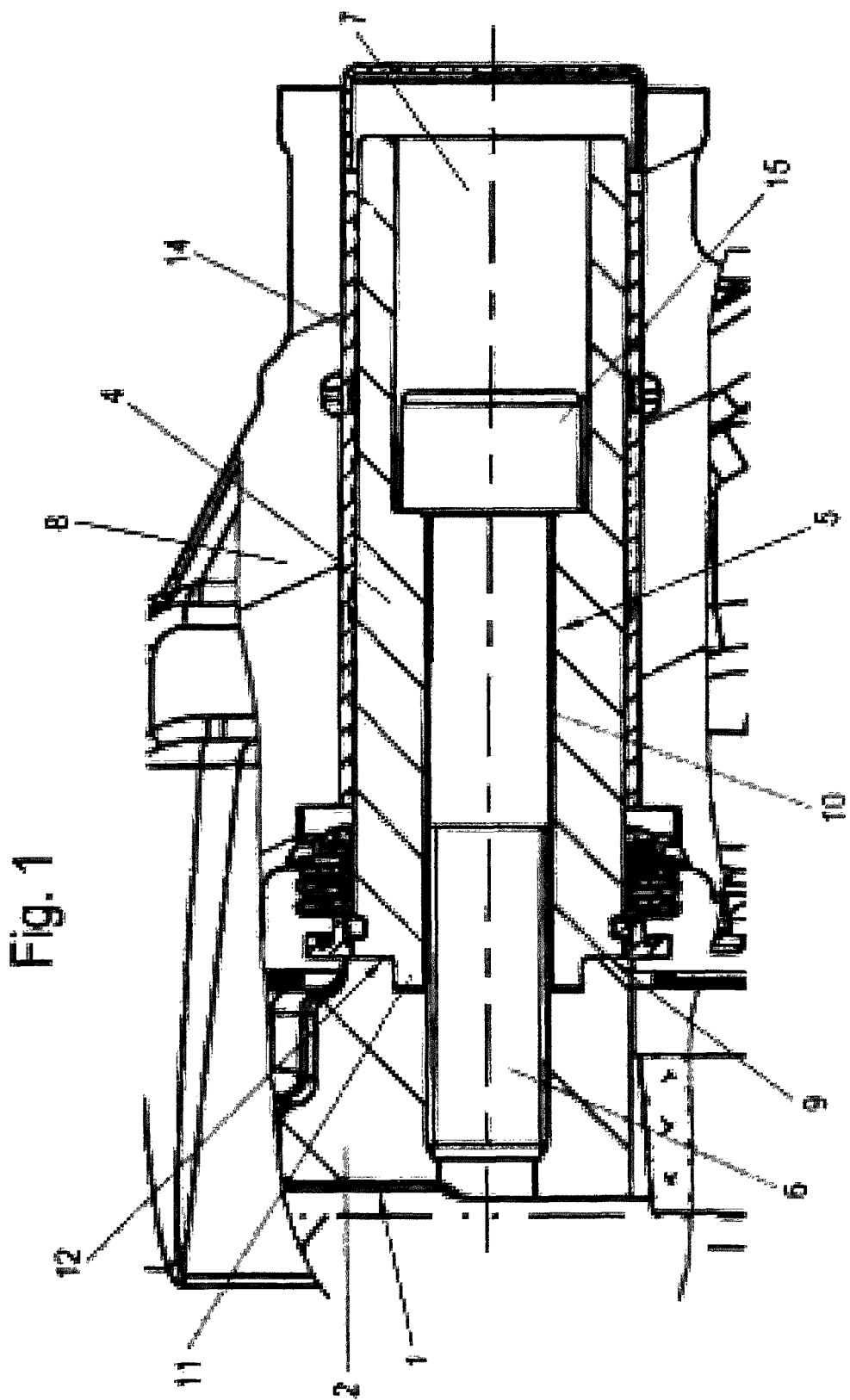
FIG. 1 shows a partial detail of a disc brake according to an embodiment of the invention in a sectional plan view.

In FIG. 1, a partial region of a disc brake according to the invention for a utility vehicle is illustrated, in which a brake caliper 8 encompassing a brake disc is displaceably held by a guide bar 4 on a stationary brake carrier 1, i.e. on the vehicle side. The guide bar 4 is connected to a stationary brake carrier 1 by a screw 5. In this case, the screw 5 is guided through the guide bar 4.

The guide bar 4 has impressing elements 12 integrally formed on the front face 9 thereof which bears against the brake carrier 1, at least in a circumferential and/or radial partial region, said impressing elements engaging by being impressed into the brake carrier 1, forming a positive connection and/or a frictional connection.

The guide bar 4, in the example having a length of 100 to 120 mm and an external diameter of 30 to 40 mm, is a component of an axial slide bearing and is guided in a slide bushing 14 held in a manner which is secured against displacement in the brake caliper 8.

Here, the guide bar 4 is held on the brake carrier 1 by a screw 5 which is configured as a machine screw, wherein a threaded shank 6 of the screw 5 is screwed into a threaded bore of a brake carrier horn 2. The head 15 of the screw 5 which is guided through an axial bore 10 of the guide bar 4 is supported on the bottom of a counterbore 7 of the guide bar 4. The counterbore 7 is preferably covered by a protective covering 34 in order to protect against contamination. Here, the protective covering 34 is preferably configured as a protective cap which can be plugged or screwed onto the end of the guide bar 4.

Figure 2:
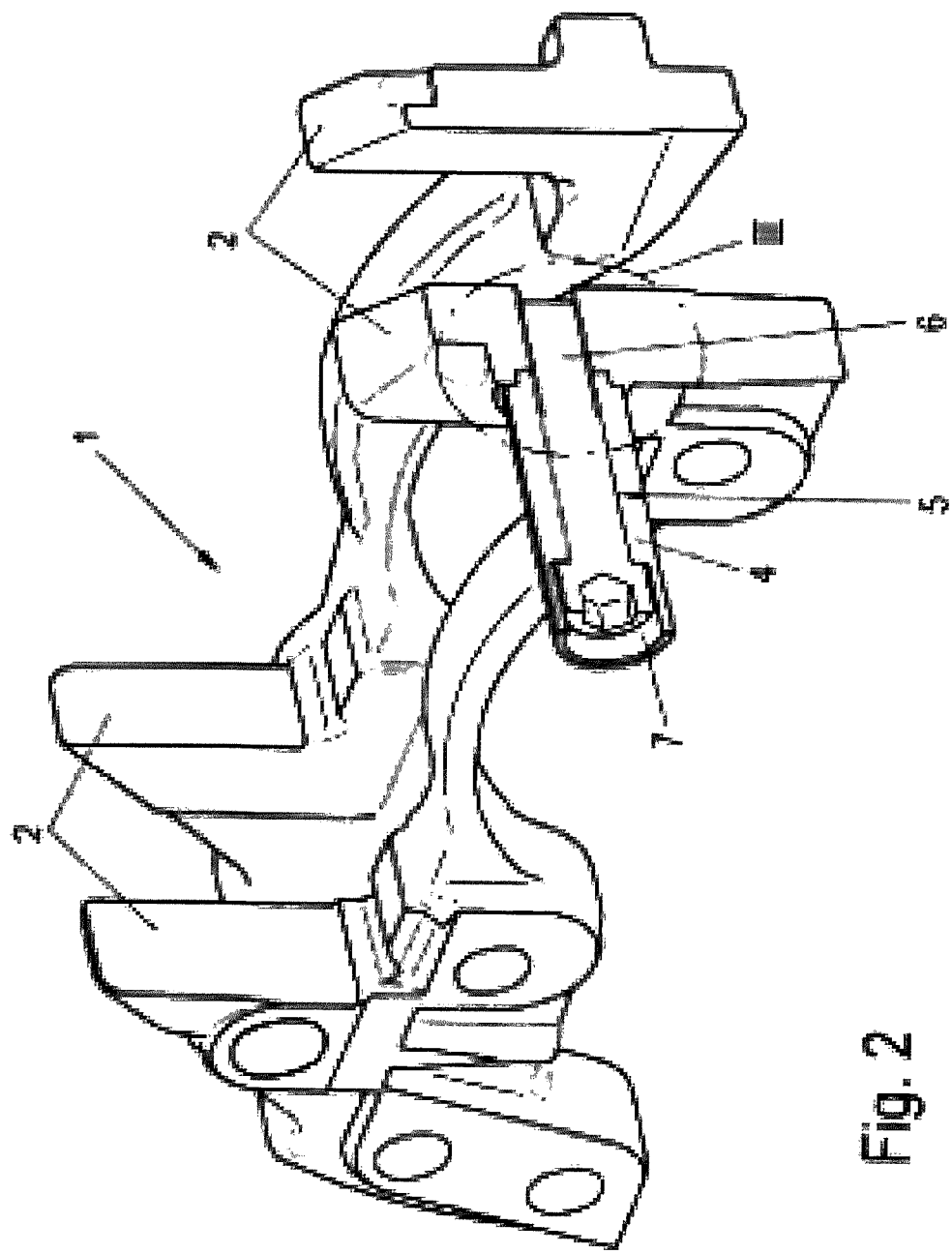
FIG. 2 shows a brake carrier of the disc brake of FIG. 1 as a detail in a perspective view.

In FIG. 2 which illustrates the brake carrier 1 as a detail with an attached guide bar 4, it may also be identified as in FIG. 1 that the guide bar 4 on the front face bears against the brake carrier 1, wherein the guide bar 4 has a concentric projection 11 which is inserted into a recess of the brake carrier 1 adapted thereto.

Figure 3:
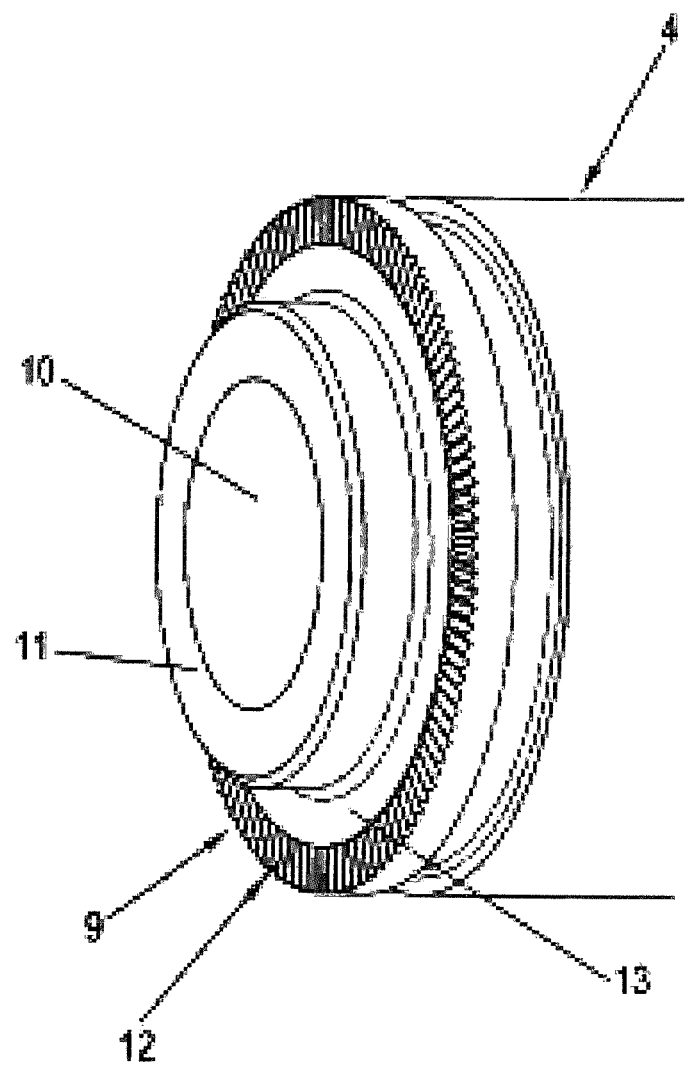
FIG. 3 shows a guide bar of the disc brake in a perspective partial detail according to the reference III in FIG. 2.

FIG. 3 shows in an enlarged view a portion of the guide bar 4. A circumferential annular surface adjacent to the projection 11 on the outside forms a front face 9 of the guide bar 4 which is provided in a circumferential external edge region with impressing elements 12 in the form of a toothing, whilst a planar surface 13, also extending concentrically, extends adjacent thereto toward the projection 11. This planar surface 13 is recessed relative to the impressing elements 12, wherein the impressing elements 12 may be approximately 0.07 to 0.11 mm high.

The arrangement of the toothing is able to be particularly clearly identified in FIG. 3. It may also be identified herein that the impressing elements 12 consist of radially oriented teeth, in each case describing an equal-sided contour in cross section.

According to the invention, the impressing elements 12 in the fastened, i.e. mounted, position of the guide bar 4 are impressed into the assigned bearing surface of the brake carrier 1, forming a positive connection.

Figure 6:
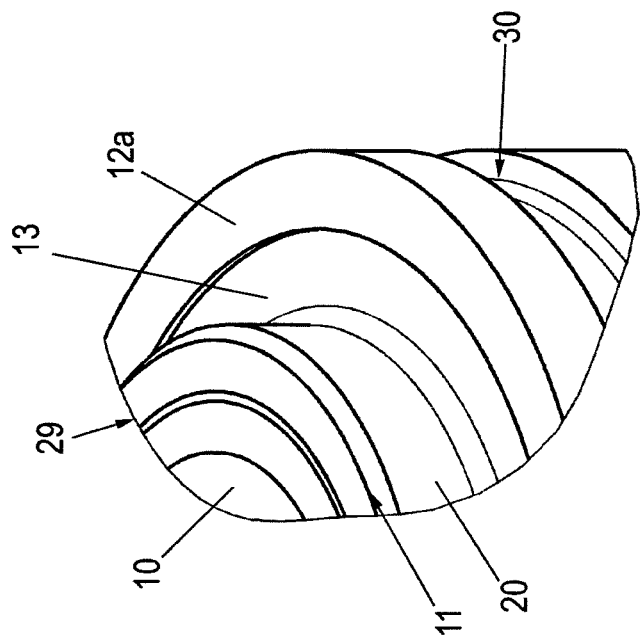
FIG. 6 shows a detailed view of a part detail of the guide bar from FIG. 4 in accordance with indication VI in FIG. 4B).
Figure 5:
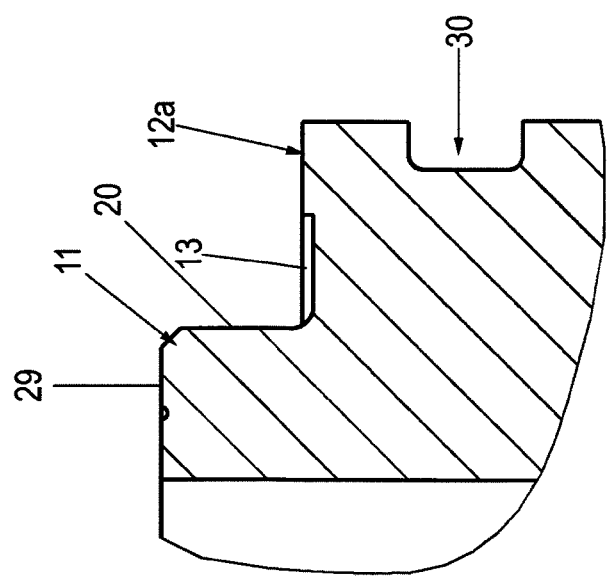
FIG. 5 shows a detailed view of a part detail of the guide bar in accordance with indication V in FIG. 4D).
Figure 7D:
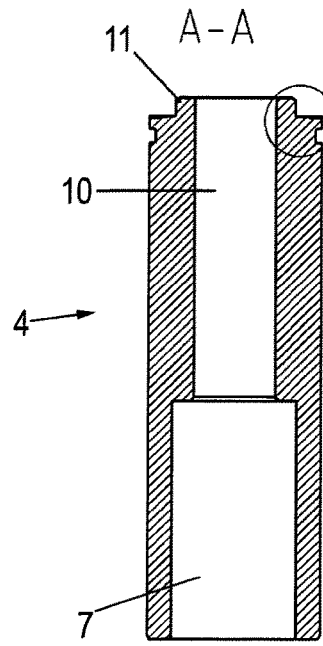
FIGS. 7A-11 show illustrations, corresponding to FIGS. 4-6, of an embodiment of a guide bar after the introduction of the impressing elements which are configured here as a serrated toothing portion.
Figure 7C:
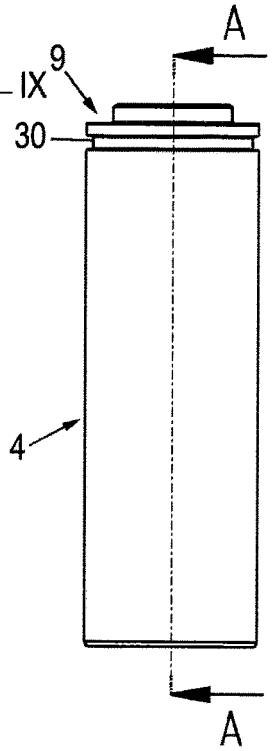
Figure 7A:
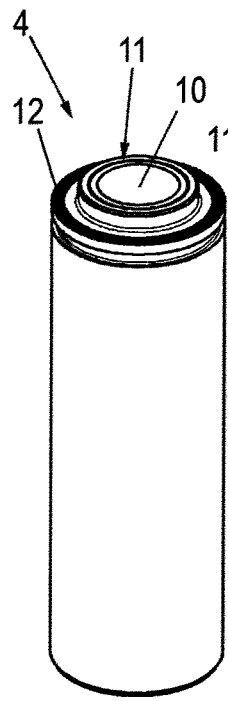
Figure 7B:
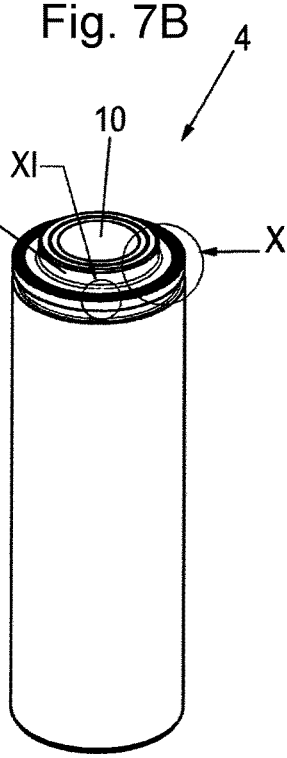

FIGS. 4 to 6 show a preliminary stage of one design variant of a guide bar 4 according to the invention before the introduction of the impressing elements 12 to a stamping annular face 12a, provided to this end, of the end face 9 of the guide bar 4.

Here, FIGS. 4A and 4B show the guide bar 4 in a perspective illustration, whereas FIG. 4C shows the guide bar 4 in a side view. FIG. 4D shows a sectional illustration of the guide bar 4 through a sectional face which is denoted by the letter d in FIG. 4C. Here, the axial bore 10 which extends centrally in the guide bar 4 for receiving the bolt 5 and the widened region of the axial bore for receiving the head 15 of the bolt 5 in the counterbore 7 can be seen clearly in FIG. 4D.

FIG. 4E shows a plan view of the guide bar 4 in accordance with FIG. 4A.

FIG. 5 shows a detailed detail of the guide bar 4 of a detail which is denoted by V in FIG. 4D. FIG. 6 correspondingly shows this detail in a perspective illustration, as denoted by VI in FIG. 4B.

As can be seen clearly, in particular, in FIGS. 5 and 6, the annular section 12a, in which the impressing elements 12 are made in a subsequent material-removing process, is slightly elevated in comparison with that planar face 13 of the end face 9 of the guide bar 4 which lies radially further to the inside in this design variant.

The projection 11 with its circumferential face 20 and an end face 29 is shown radially further to the inside. It is also conceivable to introduce impressing elements 12 into the end face 29 of the projection 11, which impressing elements 12 are impressed into an associated bearing face of the brake carrier 1 during tightening of the bolt 5 with the formation of a positively locking connection.

Figure 23:
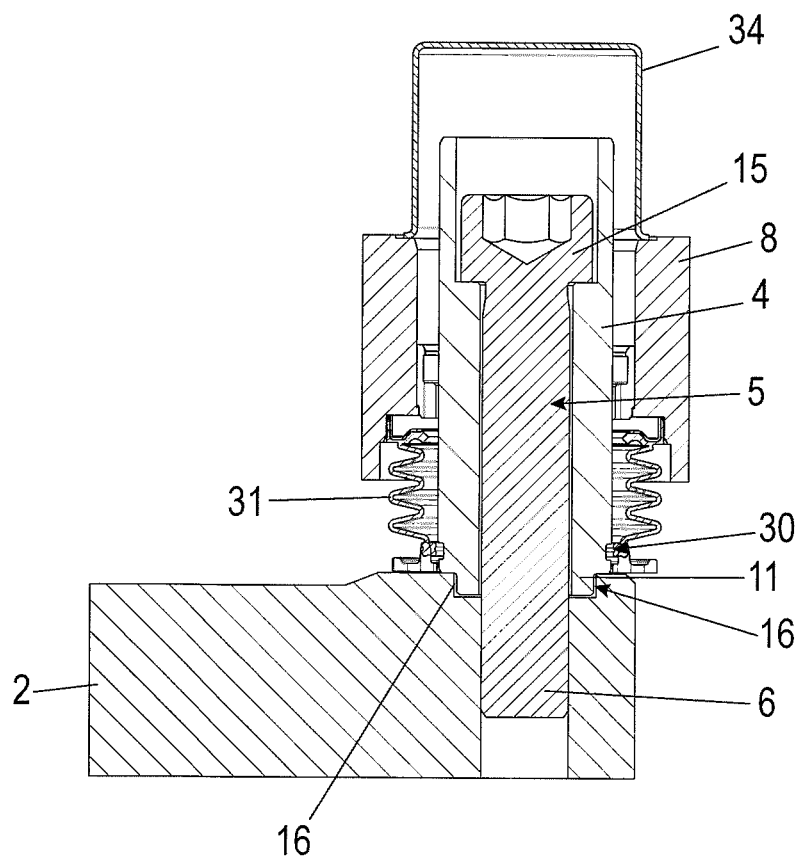
FIG. 23 shows a sectional view of an embodiment of a guide bar which is fixed on a brake carrier, with a guide bar which is adhesively bonded on the brake carrier.

A groove 30 is made in the circumferential face of the guide bar 4 axially below the impressing elements 12, which groove 30 serves to receive a sealing element 31, in particular one end of a folding bellows, as shown, for example, in FIG. 1 or 23. The other end of the sealing element 31 which is configured as a folding bellows here is fixed in a cut-out of the brake caliper 8, in which cut-out the guide bar 4 is mounted.

Figure 8:
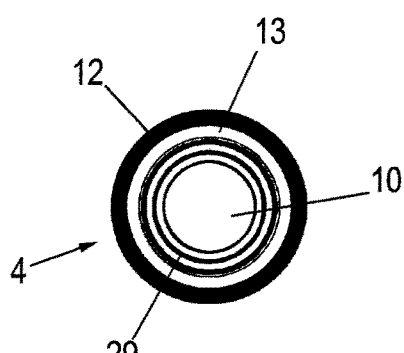
Figure 9:
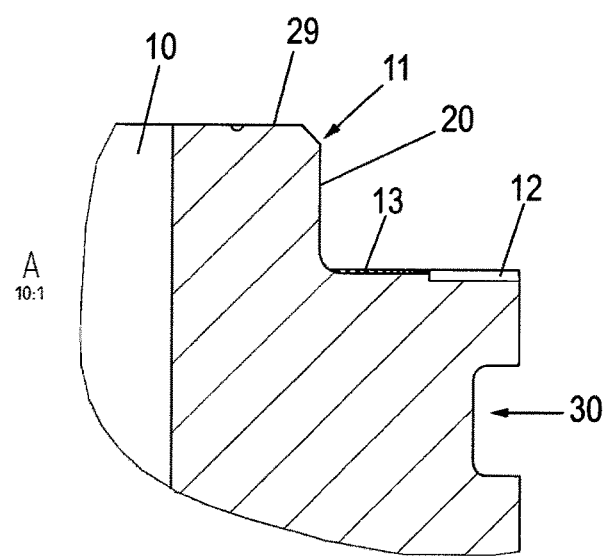

FIGS. 7 to 9 show the guide bar 4 which is described using FIGS. 4 to 6, in a state in which the annular face 12a is machined to a finish with edges which are distributed in an ordered manner here for configuring the impressing elements 12.

Figure 10:
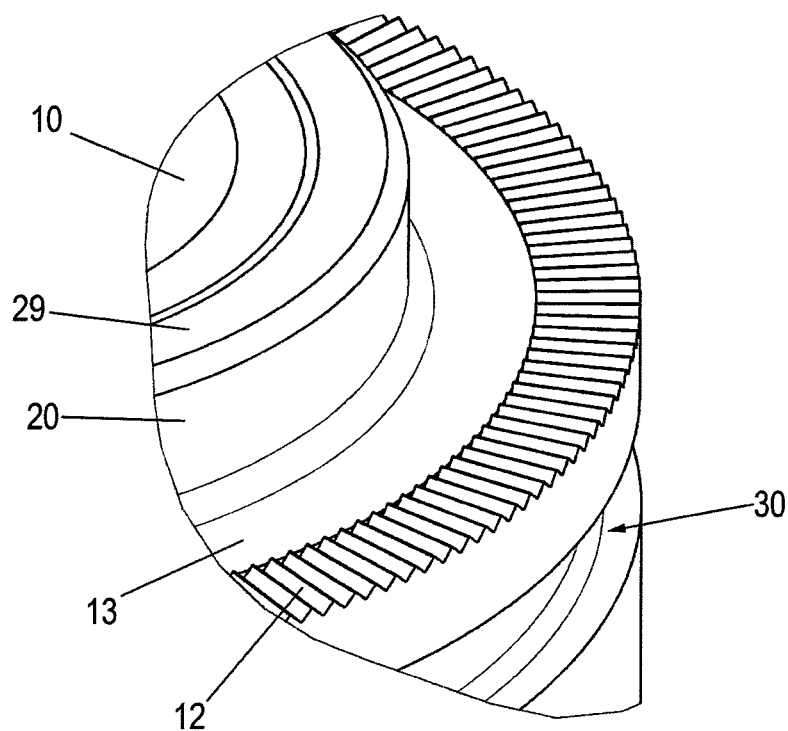
Figure 11:
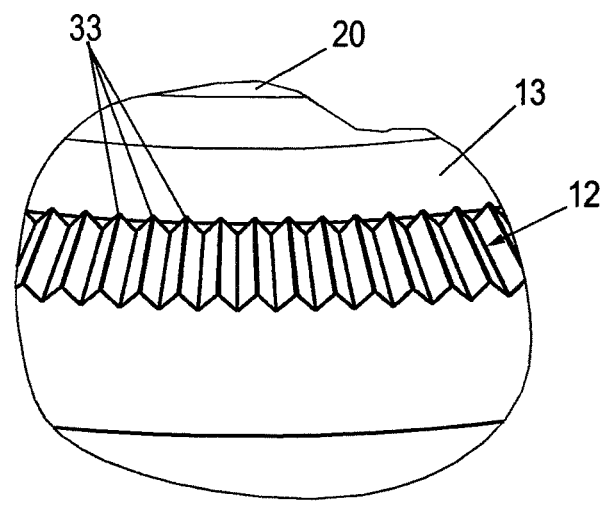
Figure 12:
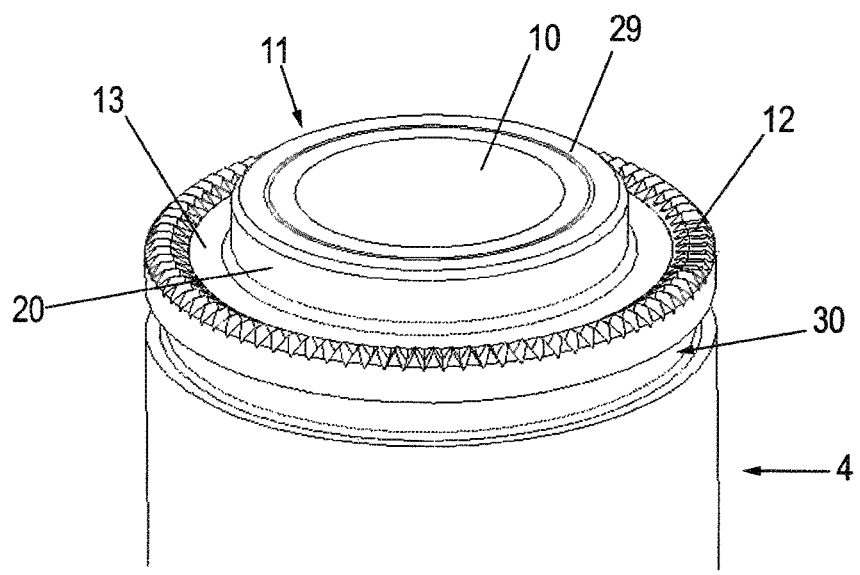
FIG. 12 shows a perspective view of the part of another embodiment of a guide bar provided with impressing elements with a serrated toothing portion having beveled end sides.
Figure 13:
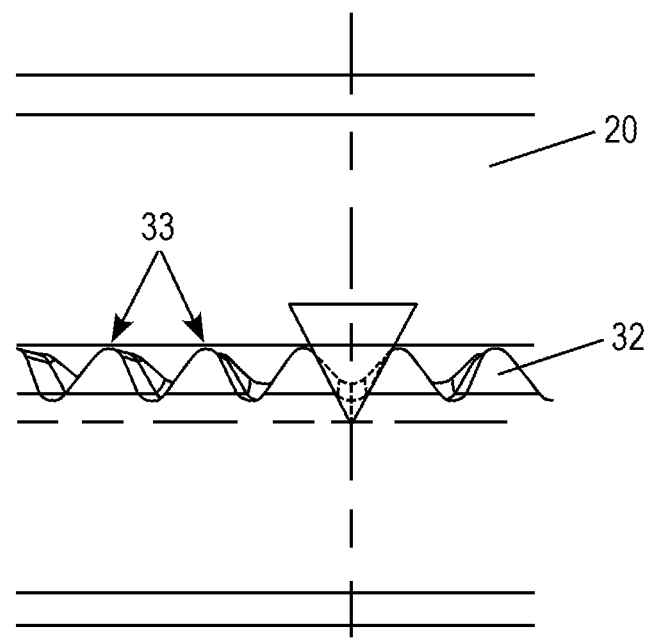
FIG. 13 shows a side view of the toothing portion of the guide bar in accordance with FIG. 12.
Figure 14:
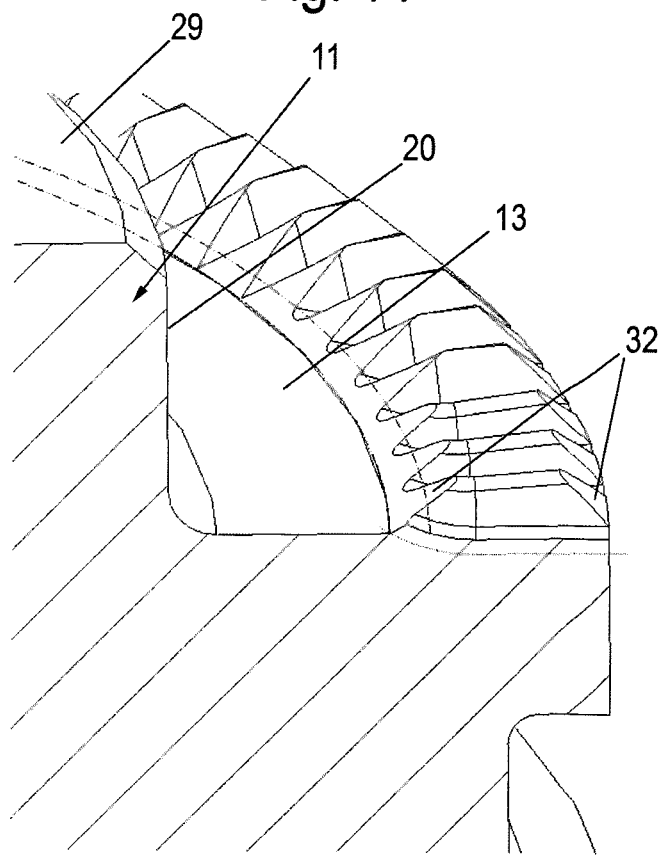
FIGS. 14 and 15 show further detailed illustrations of the toothing portion of the guide bar in accordance with FIG. 12.
Figure 15:
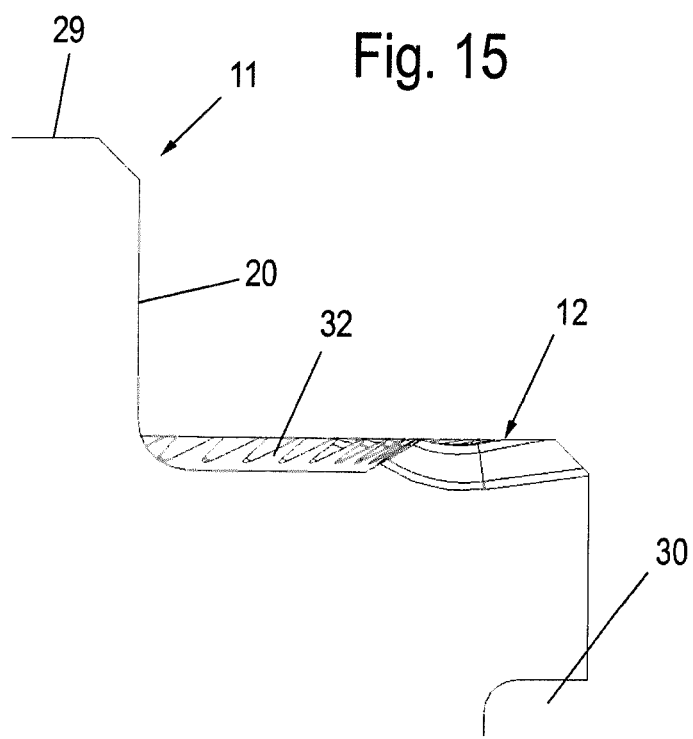
Figures 16, 17:
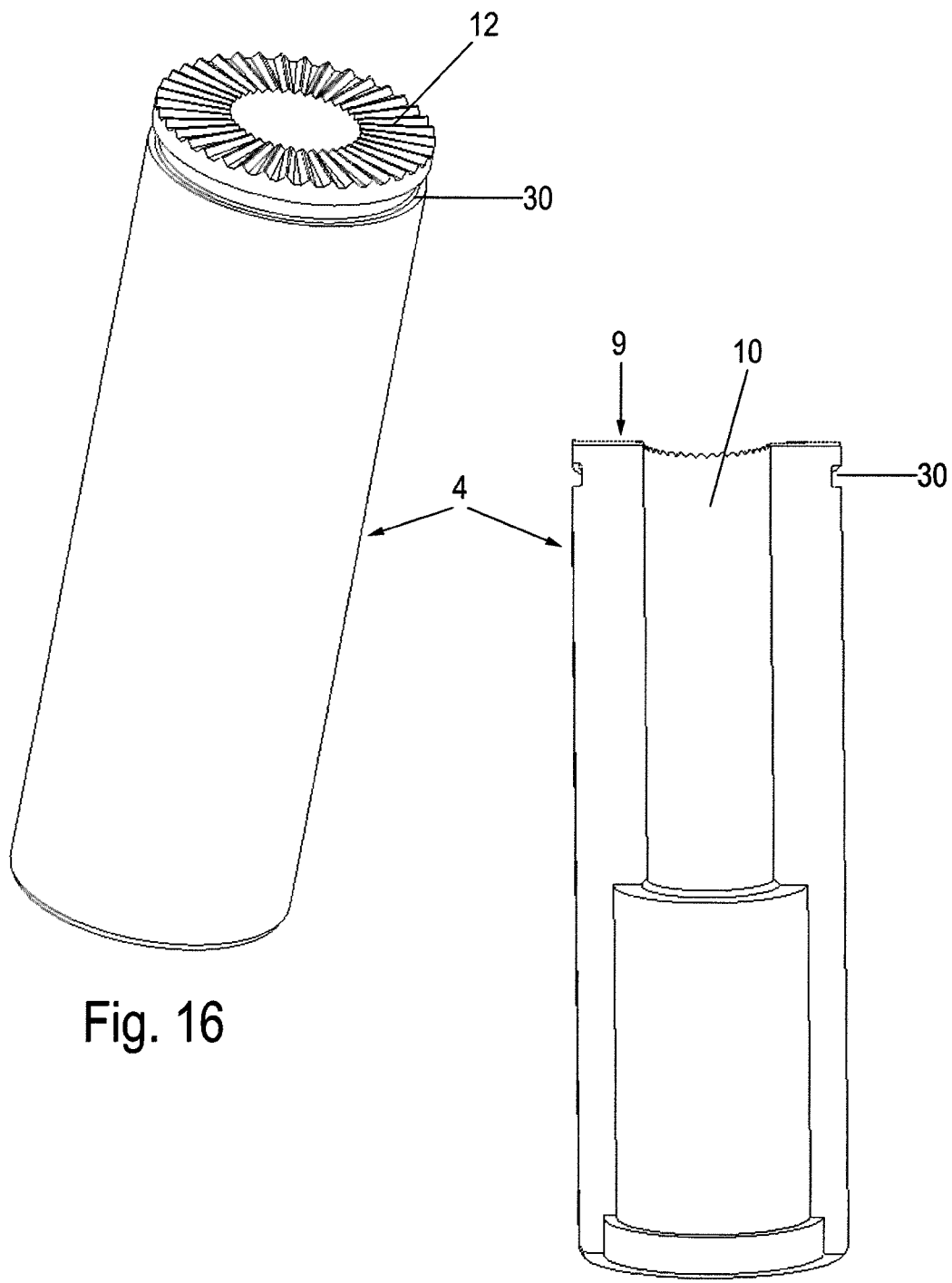
FIG. 16 shows a perspective illustration of a further embodiment of a guide bar with impressing elements which take up the entire end face of the guide bar.
FIG. 17 shows a view of a longitudinal section through the guide bar which is shown in FIG. 16.
Figure 18:
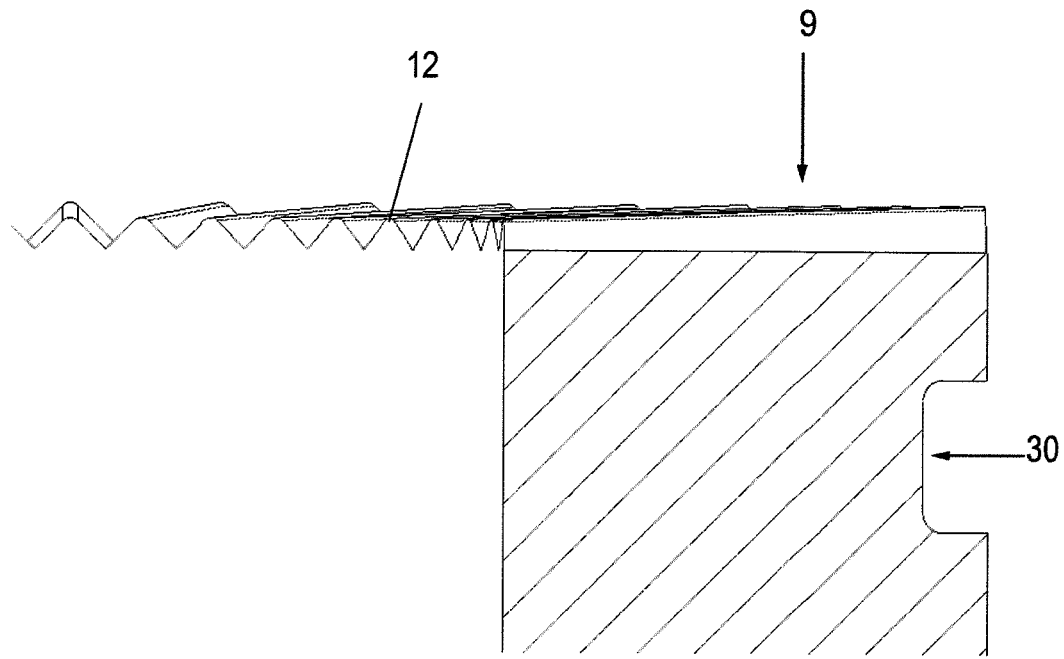
FIGS. 18 and 19 show enlarged illustrations of the toothing portion of the guide bar which is shown in FIG. 16.
Figure 19:
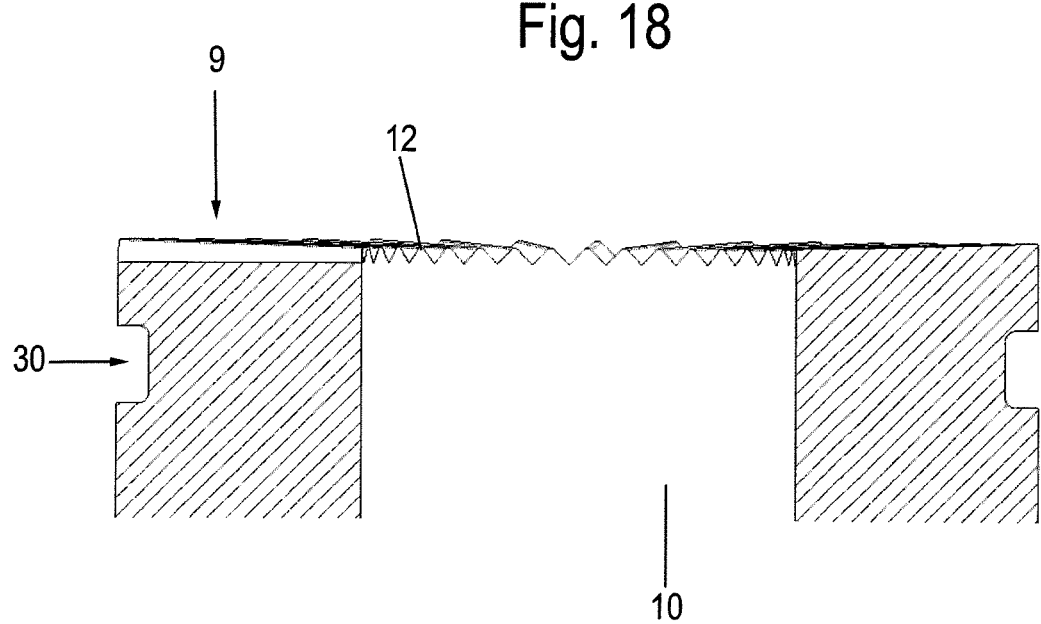

As shown in FIGS. 10 and 11, the impressing elements 12 are preferably configured as a wedge-shaped toothing portion. The individual teeth 33 of said impressing elements 12 which are configured as a wedge-shaped toothing portion are configured here with edges of an identical height which run radially with respect to the longitudinal axis of the guide bar 4. Here, the detailed detail which is shown in FIG. 10 corresponds to the detail which is denoted by X in FIG. 7B. The detailed detail which is shown in FIG. 11 corresponds to that detail of the guide bar 4 which is denoted by XI in FIG. 7B.

In the design variant which is shown in FIGS. 12 to 15, the impressing elements 12 are likewise configured as a toothing portion 12 which is arranged in an annular manner. Here, the radial extent of the base of the individual teeth is longer than the upper edges of the individual teeth. Here, the end faces 32 of the individual teeth 33 of the impressing elements 12 are correspondingly of bevelled configuration, as a result of which the active pressure on the bearing face of the brake carrier 1 is increased during tightening of the bolt.

In the design variant which is shown in FIGS. 12 to 15, the planar face 13 is arranged between the radially outer impressing elements 12 and the projection 11.

In the further design variant (shown in FIGS. 16 to 19) of a guide bar 4 according to the invention, the impressing elements 12 are arranged in a concentric annular region. In the design variant which is shown here, the end face 9 of the guide bar 4 is covered completely with impressing elements 12. Here, the impressing elements 12 are once again configured as a toothing portion, with the radially extending edges which are of radially outwardly slightly elevated configuration.

Figure 20:
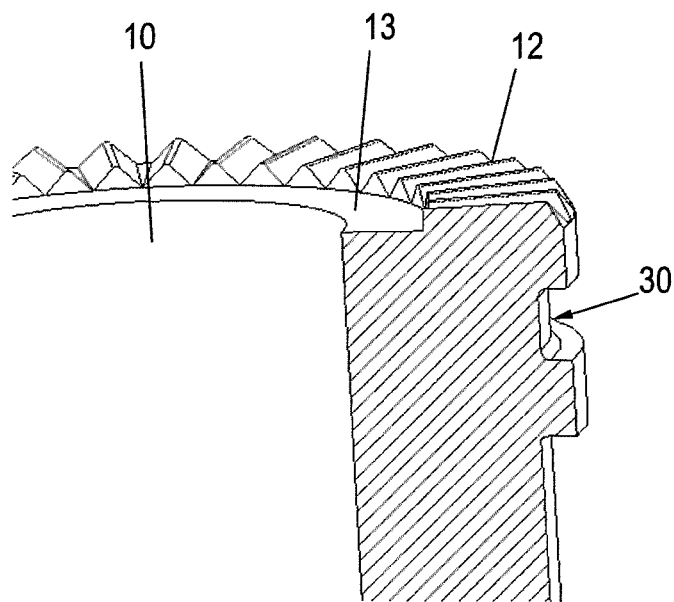
FIG. 20 shows a perspective view of a longitudinal section of a further embodiment of a guide bar with a serrated toothing portion in the radially outer region of the end face.

FIG. 20 shows a detail of a further design variant of a guide bar 4 according to the invention with impressing elements 12 which are configured with a toothing portion which extends radially inward from a circumferential outer edge of the end face 9, in which an annular face which lies radially further to the inside is configured as a planar face 13. In this design variant, the planar face 13 directly adjoins the axial bore 10 of the guide bar 4 for receiving the bolt 5. A projection 11 which rises beyond the end face 9 is not provided in this guide bar 4.

Figure 21:
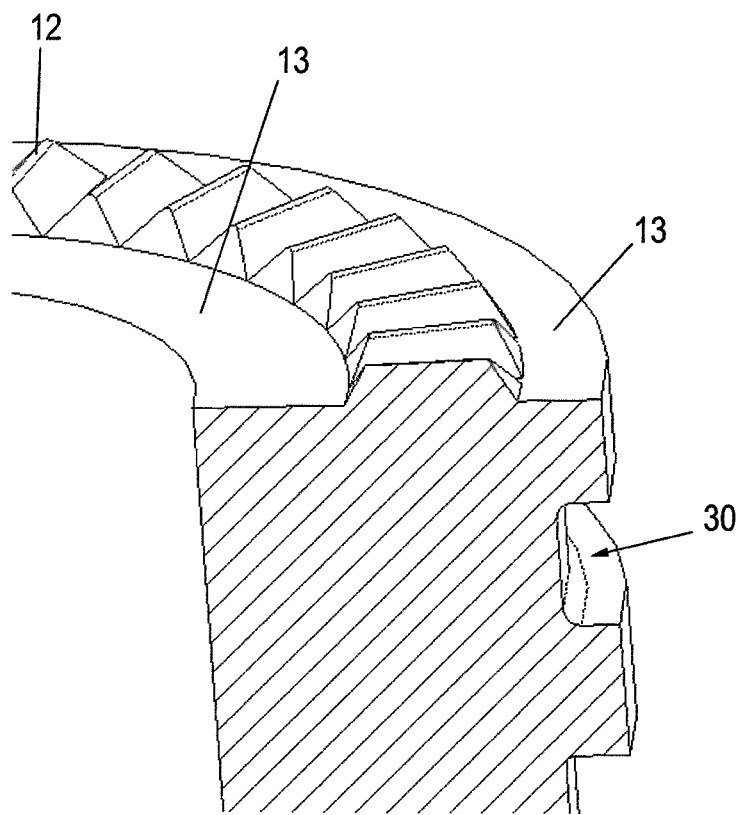
FIG. 21 shows an illustration (corresponding to FIG. 20) of a further embodiment of a guide bar with a serrated toothing portion which is arranged radially centrally.

It is also conceivable, as shown in FIG. 21, to provide two concentrically arranged planar faces 13 on the end face 9 of the guide bar 4, the impressing elements 12 being integrally formed between the planar faces 13.

Instead of the configuration with symmetrical teeth, the toothing may also be configured as spline toothing.

Optionally, the impressing elements 12 are configured as points or edges distributed in an ordered or unordered manner and of equal or unequal height.

Figure 28:
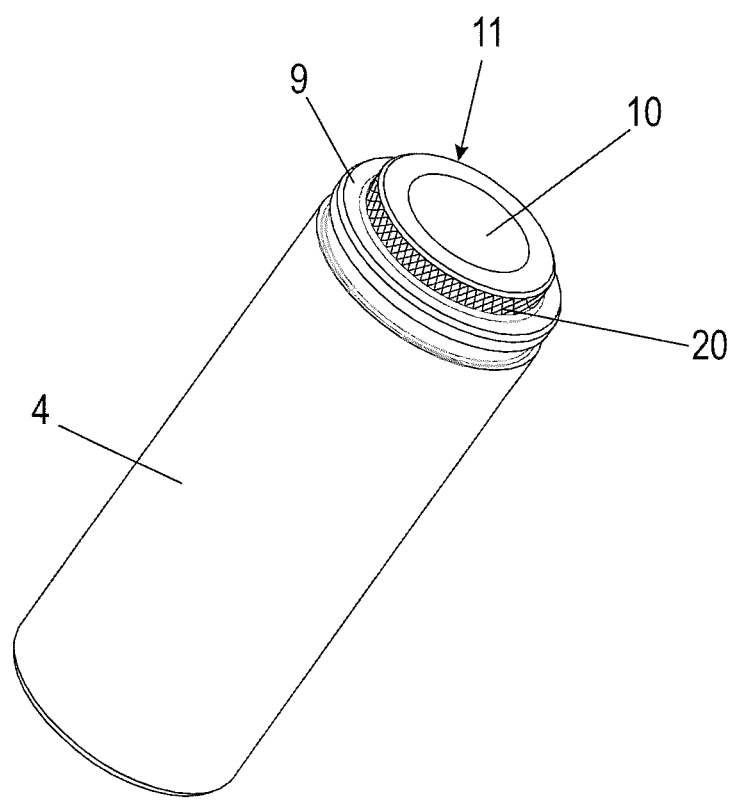
FIG. 28 shows a perspective view of a detail of a further embodiment of a guide bar, in which the circumferential face of a projection is provided with a knurled portion.

In particular, in a specific embodiment, the impressing elements 12 are configured as knurling or toothing, as in the alternative embodiment shown in FIG. 28, for example.

Moreover, in a specific embodiment, the planar surface 13 is provided in an inner and/or outer concentric annular region relative to the impressing elements 12.

Moreover, in a specific embodiment, the planar surface 13 is recessed in the axial direction relative to the impressing elements 12 or protrudes relative to the impressing elements 12.

Figure 22:
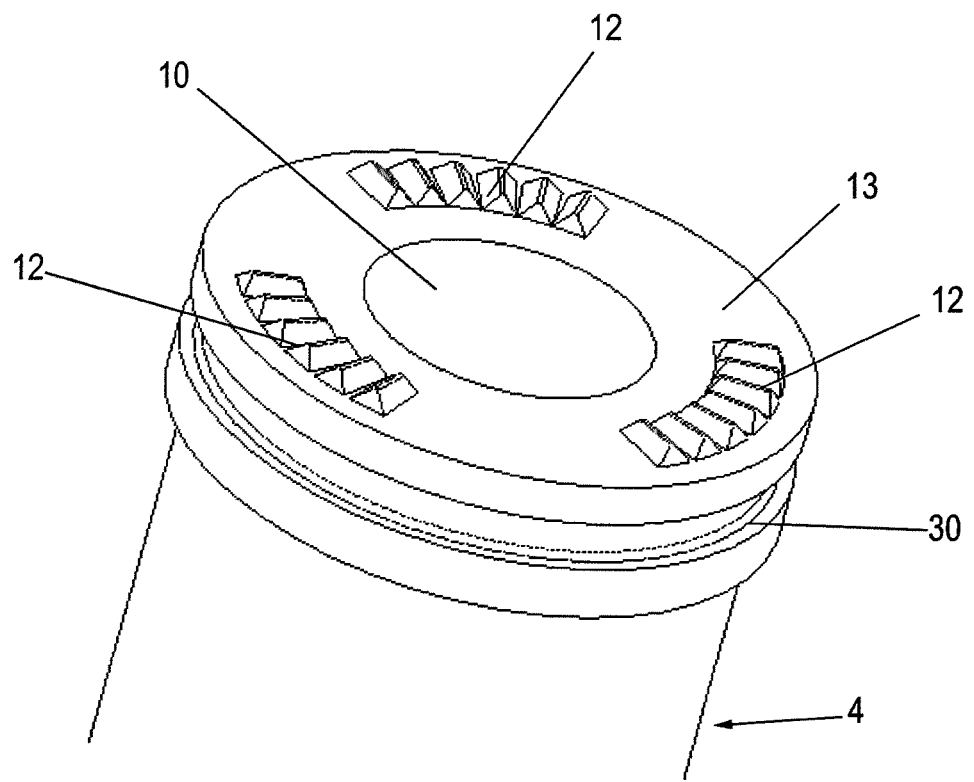
FIG. 22 shows a perspective view of a detail of a further embodiment of a guide bar with impressing elements which are integrally formed in a radial and circumferential part region.

Moreover, in a specific embodiment, regions with impressing elements 12 and regions with planar surfaces 13 are alternately configured in each case as segment regions on the circumference, as shown in FIG. 22.

In the embodiment shown there, in each case at least three segment regions are preferably provided at the same angular spacing from one another.

Moreover, in a specific embodiment, the toothing 12 is configured as crown gear toothing, the tooth flanks thereof being radially oriented.

Moreover, in a specific embodiment, the toothing 12 is configured as spline toothing.

Moreover, in a specific embodiment, the impressing elements 12 have a greater hardness than the brake carrier 1 in the bearing region of the guide bar 4.

Moreover, in a specific embodiment, the guide bar 4 is hardened at least in the region of the impressing elements 12 after the introduction thereof.

It is also conceivable to wet the end face 9 of the guide bar 4 with an adhesive 16 and, as a result, to adhesively bond the guide bar 4 to the brake carrier 1, in particular additionally.

It is likewise conceivable to provide the end side 9 of the guide bar 4 with a diamond spray coating, in order to increase the roughness of the end face 9. This achieves a situation where the diamond spray coating digs into the supporting face of the brake carrier 1 during tightening of the bolt 5 on the brake carrier 1.

Instead of spraying with a diamond spray coating of this type, it is likewise conceivable to insert a diamond disc between the end side 9 of the guide bar 4 and the supporting face on the brake carrier 1. Here, the particle size of the individual diamonds is adapted correspondingly to the material of the brake carrier 1.

Figure 24:
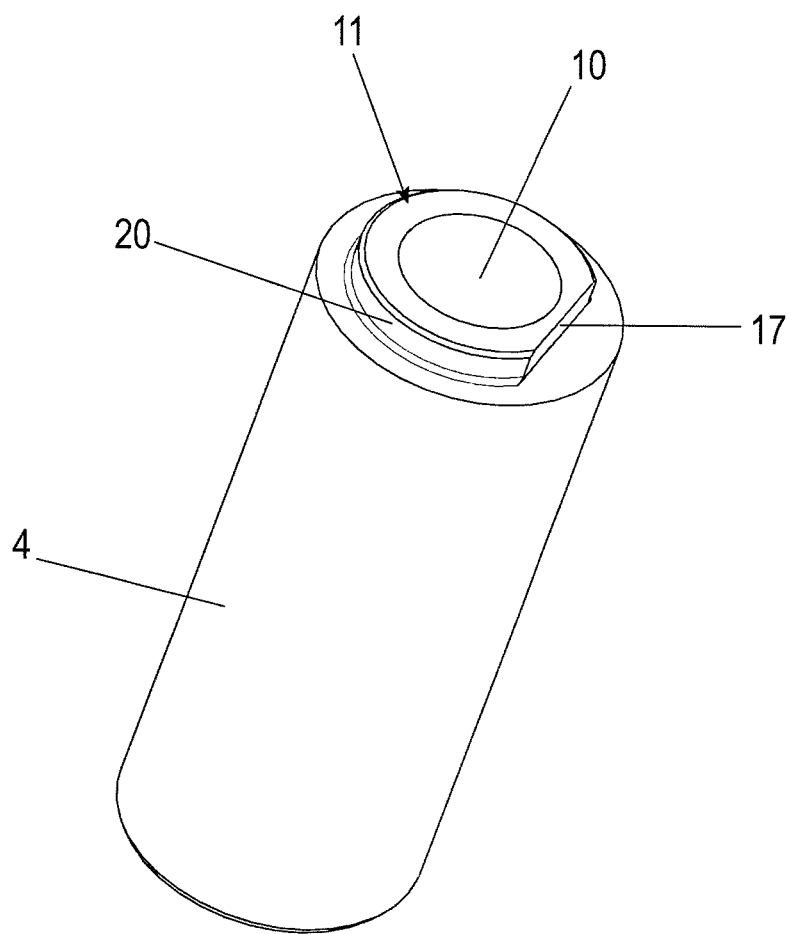
FIG. 24 shows a perspective view of a detail of a further embodiment of a guide bar with a part-annular projection with a key face.

As an alternative or in addition to the provision of impressing elements 12 on the end face 9 of the guide bar 4, the guide bar 4 has a projection 11 in one alternative design variant which is shown in FIG. 24, which projection 11 is received fixedly in a recess, adapted to it, of the brake carrier 1 so as to rotate with it, with the formation of a positively locking connection. In the design variant which is shown here, a circumferential outer face 20 of the projection 11 of the guide bar 4 and a circumferential inner face of the recess of the brake carrier 1 are of part-annular configuration. In particular, a segment of the circumferential outer face 20 of the projection 11 and a segment of the circumferential inner face of the recess of the brake carrier 1 are formed in a flattened manner and therefore, in the rotational direction of the bolt 5, form a positively locking connection of the projection 11 to the circumferential inner face of the recess of the brake carrier 1.

It is also conceivable for the circumferential outer face 20 of the projection 11 of the guide bar 4 and the circumferential inner face of the recess of the brake carrier 1 to be of polygonal configuration, for example as a rectangle or hexagon.

Figure 29:
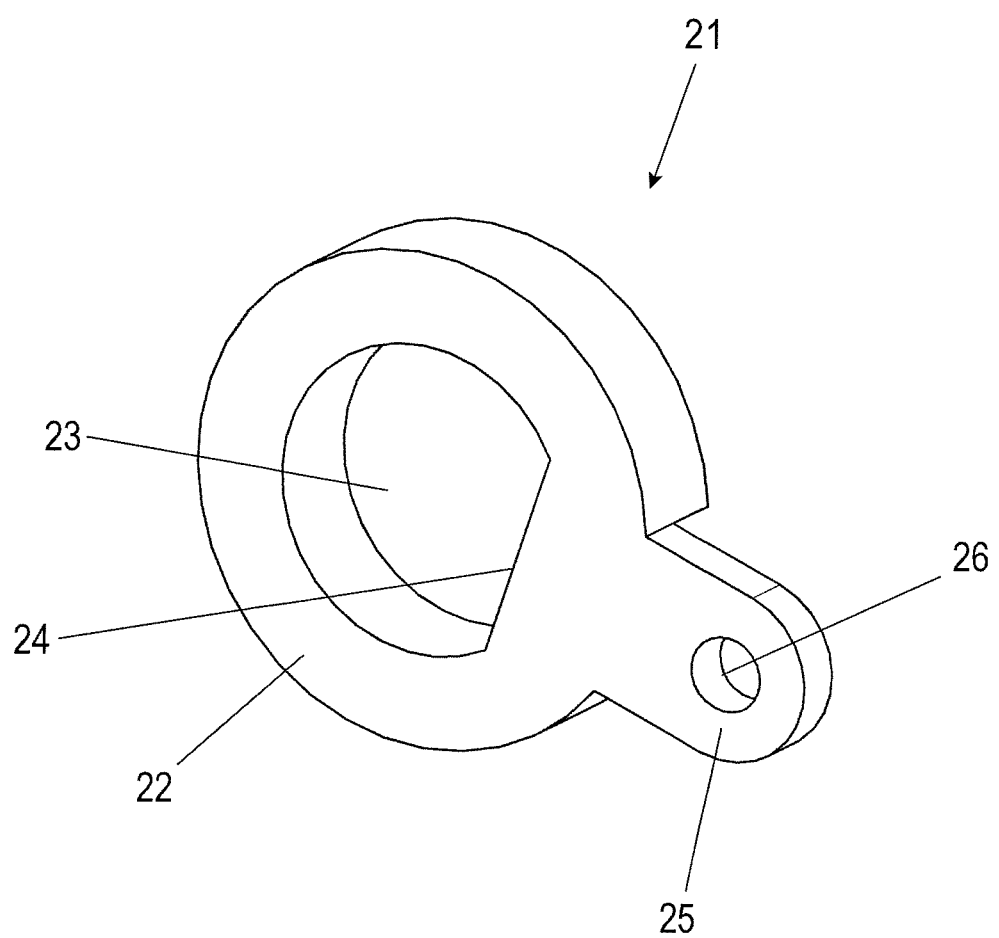
FIG. 29 shows a perspective view of an embodiment of an anti-rotation securing ring which can be placed onto a projection with a key face.

It is also conceivable to enclose the projection 11 by an anti-rotation securing ring 21 (as shown in FIG. 29) which lies on the brake carrier 1.

Here, the anti-rotation securing ring 21 and the brake carrier 1 have a bore 26 which extends parallel to the bolt 5 and on which a pin is received which secures the anti-rotation securing ring 21 against rotation relative to the brake carrier 1.

Figure 25:
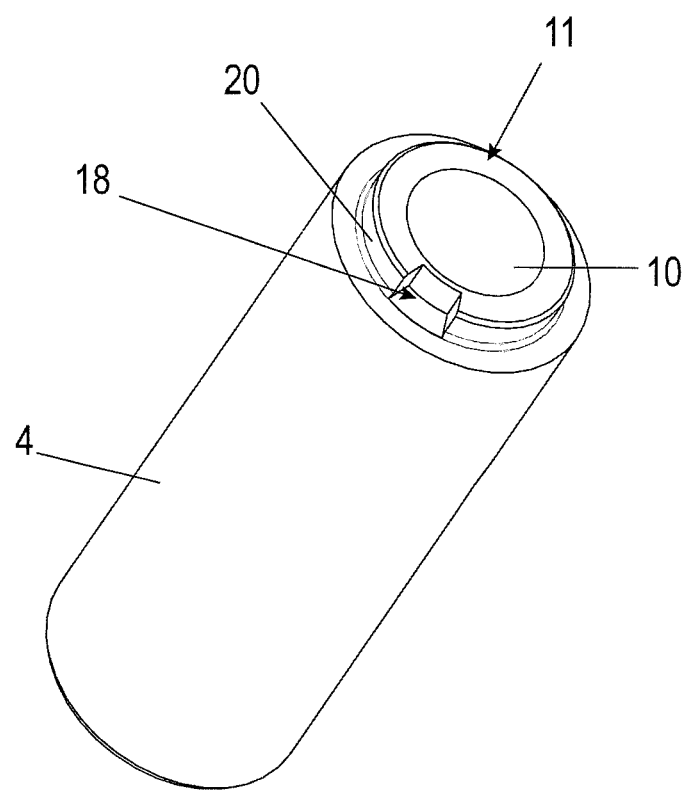
FIG. 25 shows a perspective view of a detail of a further embodiment of a guide bar with a part-annular projection with a receptacle for a feather key.

In the further design variant which is shown in FIG. 25, a segment of the circumferential outer face 20 of the projection 11 and a segment of the circumferential inner face of the recess of the brake carrier 1 have a receptacle 18, on which a feather key is inserted which serves to prevent a rotational movement of the guide bar 4 about the rotational axis of the bolt 5.

It is also conceivable that at least one part region of the circumferential outer face 20 of the projection 11 has impressing elements 12 which are integrally formed on it and engage into the brake carrier 1 in an impressed manner with the formation of a positively locking connection and/or a frictionally locking connection. In the design variant which is shown in FIG. 28, the impressing elements 12 are configured as a knurled portion.

Figure 26:
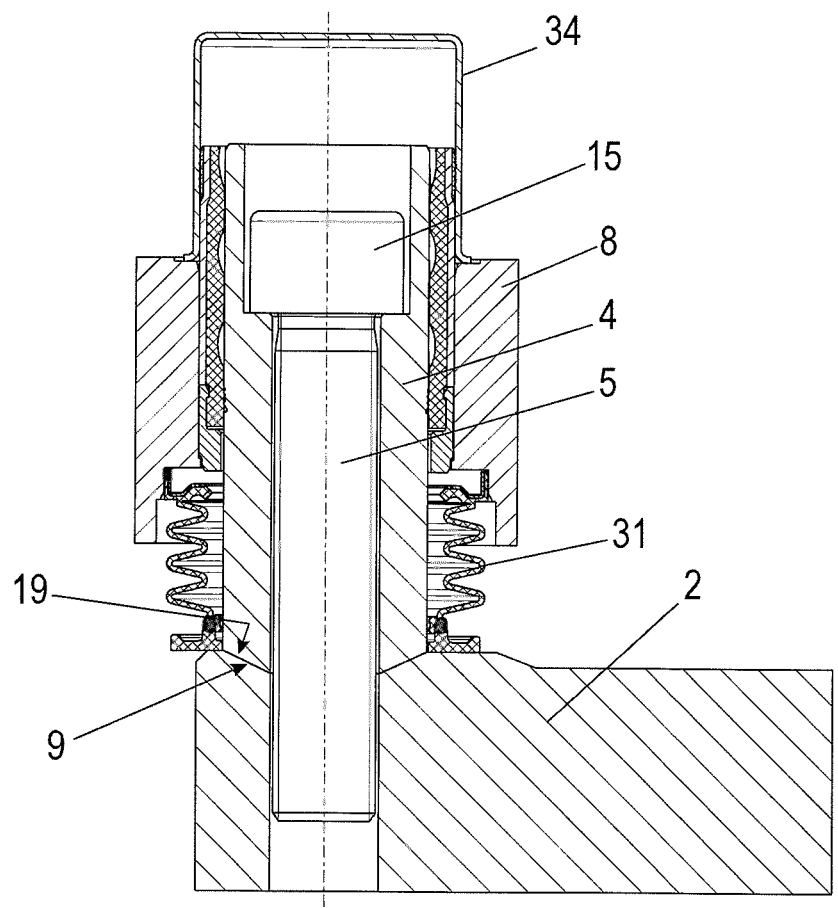
FIGS. 26 and 27 show sectional views through further embodiments of guide bars which are fixed on a brake carrier, with an end face of cone envelope-shaped configuration of the guide bar and a correspondingly formed receptacle of the brake carrier.

In a further design variant which is shown in FIG. 26, in order to center the guide bar 4 and to increase the end face 9 of the guide bar 4, an end face 9, bearing against the brake carrier 1, of the guide bar 4 and a recess of the brake carrier 1 for receiving at least the end face 9 of the guide bar 4 are of cone envelope-shaped configuration.

In this design variant, the end face 9 of the guide bar 4 is configured so as to rise toward the bolt 5.

Figure 27:
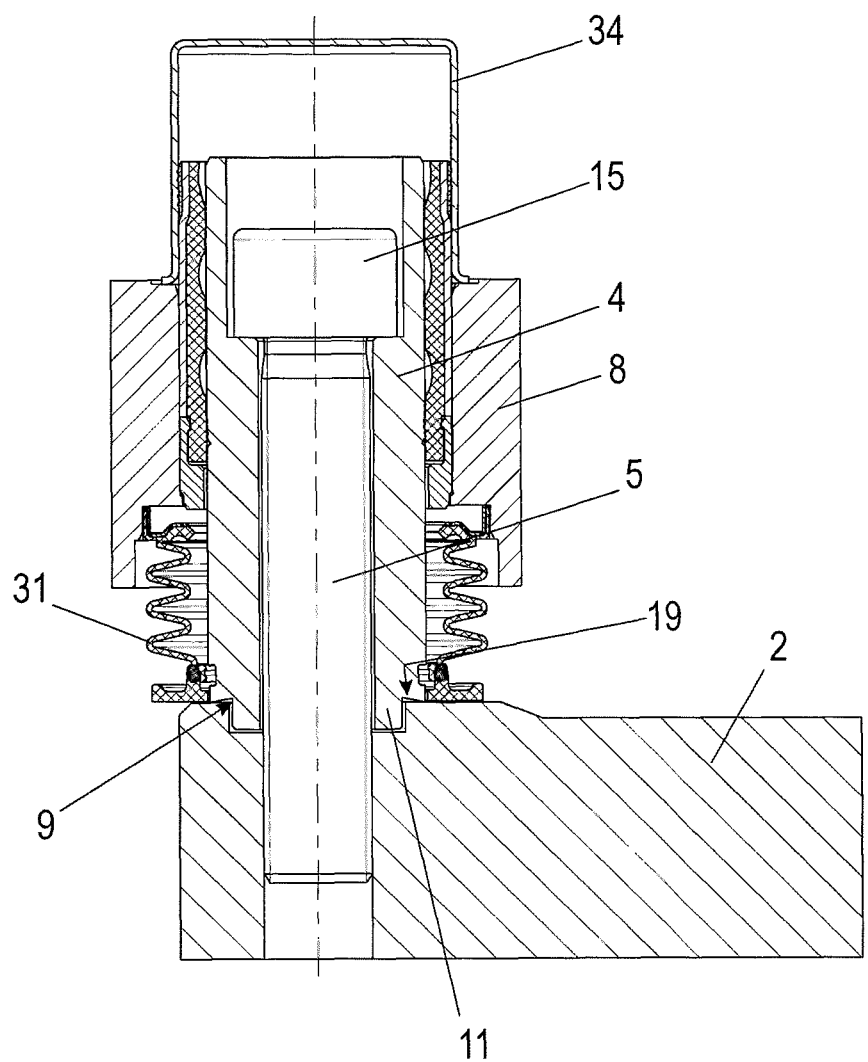

In the design variant which is shown in FIG. 27, the end face 9 of the guide bar 4 is configured so as to fall toward the bolt 5.

Figure 30:
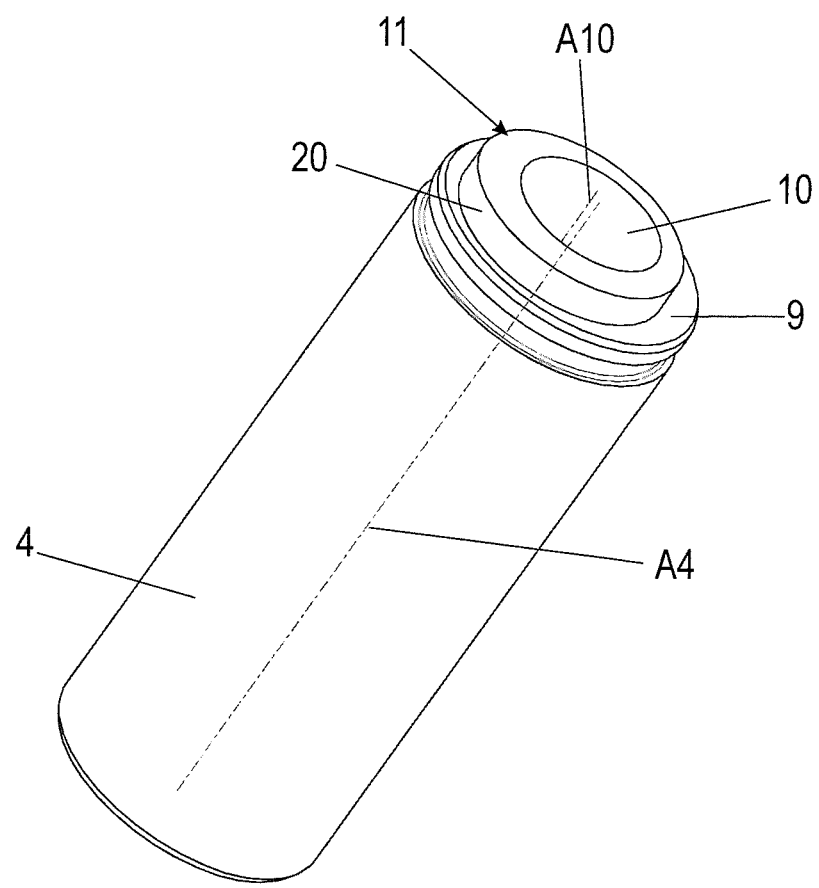
FIG. 30 shows a perspective view of a detail of a further embodiment of a guide bar with a receiving bore which is arranged eccentrically with respect to the rotational axis of the guide bar for receiving the bolt for fastening the guide bar to the brake carrier.

In the further design variant (shown in FIG. 30) of a guide bar 4 according to the invention, the bore 10 in the guide bar 4, in which bore 10 the bolt 5 is received, is displaced eccentrically with respect to the rotational axis $A_4$ of the guide bar 4. As a result, the rotational axis of the guide bar 4 and the rotational axis $A_{10}$ of the bolt 5 are not concentric, which likewise counteracts a rotation of the guide bar 4. Here, the dimension of the displacement of the two said axes is preferably more than 1.5 mm, particularly preferably more than 3 mm.

Figure 31:
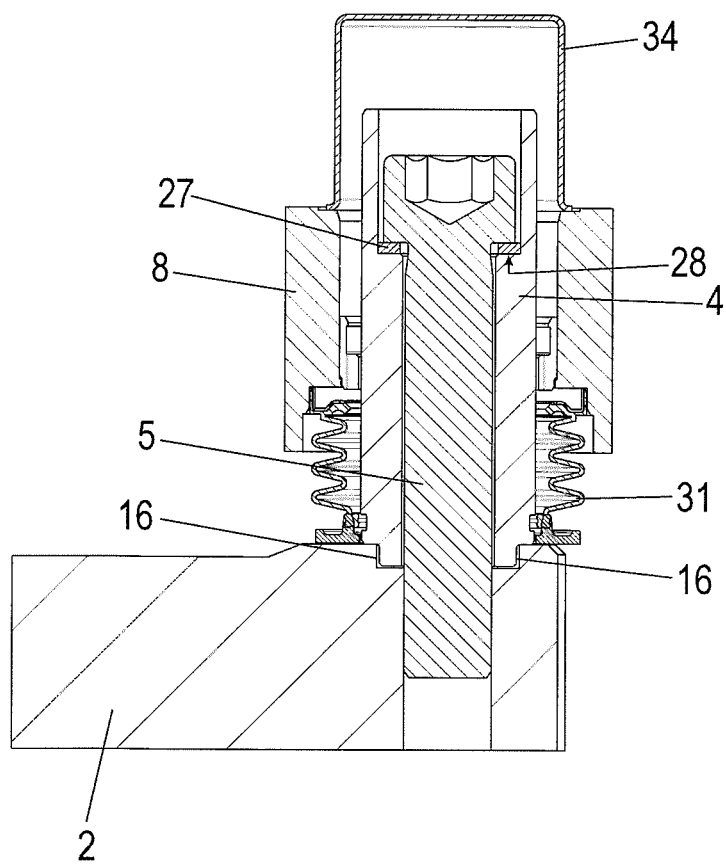
FIG. 31 shows a sectional view through a guide bar which is fixed on a brake carrier in a further embodiment, in which a sliding ring is arranged between the bolt head and a bearing step in the guide bar.

In the design variant which is shown in FIG. 31, a sliding ring 27 is arranged between a bolt head 15 of the bolt 5 and a supporting face 28 of the bolt head 15 in the guide bar 4. This makes it possible that the guide bar 4 can rotate with respect to the brake carrier 1, without releasing the screwed connection of the bolt 5 to the brake carrier 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

| List of reference numerals | |
|---|---|
| 1 | Brake carrier |
| 2 | Brake carrier horn |
| 4 | Guide bar |

| List of reference numerals | |
|---|---|
| 5 | Screw |
| 6 | Threaded shank |
| 7 | Counterbore |
| 8 | Brake caliper |
| 9 | Front face |
| 10 | Bore |
| 11 | Projection |
| 12 | Impressing element |
| 12a | Ring |
| 13 | Planar surface |
| 14 | Slide bushing |
| 15 | Head |
| 16 | Adhesive |
| 17 | Key face |
| 18 | Receptacle |
| 19 | Bearing face |
| 20 | Circumferential outer face |
| 21 | Anti-rotation securing ring |
| 22 | Annular body |
| 23 | Passage opening |
| 24 | Key face |
| 25 | Extension |
| 26 | Bore |
| 27 | Sliding ring |
| 28 | Supporting face |
| 29 | End face |
| 30 | Groove |
| 31 | Sealing element |
| 32 | Bevel |
| 33 | Tooth |
| 34 | Protective covering |
| $A_4$ | Rotational axis of the guide bar |
| $A_{10}$ | Central axis of the bore in the guide bar |

What is claimed is:

1. A disc brake for a utility vehicle, comprising:
a brake caliper configured to straddle a brake disc;
a guide bar configured to be connected to a brake carrier and displaceably support the brake caliper; and
a screw guided through the guide bar arranged to connect the guide bar to the brake carrier,
wherein
at least one of the guide bar and the brake carrier has impressing elements, where
if the guide bar has impressing elements, the guide bar in at least one of a circumferential region and radial partial region of the guide bar has the impressing elements integrally formed on a guide bar front face that bears against the brake carrier, the impressing elements being impressed into the brake carrier such that at least one of a positive connection and a frictional connection are formed when the screw is in an installed position, and
if the brake carrier has impressing elements, a bearing face of the brake carrier in a circumferential and/or radial part region of the bearing face has the impressing elements integrally formed on a front face that bears against the end face of the guide bar, the impressing elements being impressed into the guide bar such that at least one of a positive connection and a frictional connection are formed when the screw is in an installed position.

2. The disc brake according to claim 1, wherein the impressing elements are points or edges distributed in an ordered or unordered manner and of equal or unequal height.

3. The disc brake according to claim 2, wherein the impressing elements are knurling or toothing.

4. The disc brake according to claim 1, wherein the impressing elements are arranged in a concentric annular region of at least one of the guide bar front face or the brake carrier bearing face.

5. The disc brake according to claim 4 wherein adjacent to the impressing elements at least one planar surface is arranged in at least one partial portion of the concentric annular region.

6. The disc brake according to claim 5, wherein the at least one planar surface is provided in portions of the concentric annular region radially inside and radially outside the impressing elements.

7. The disc brake according to claim 5, wherein the at least one planar surface is recessed or protrudes in an axial direction relative to the impressing elements.

8. The disc brake according to claim 5, wherein segment regions with the impressing elements and regions with the at least one planar surfaces are alternately arranged as segment regions circumferentially around the concentric annular region.

9. The disc brake according to claim 8, wherein at least three of the segment regions are arranged with a same angular spacing from one another.

10. The disc brake according to claim 3, wherein the impressing elements are teeth configured as crown gear teeth having radially oriented flanks.

11. The disc brake according to claim 3, wherein the impressing elements are teeth configured as spline teeth.

12. The disc brake according to claim 1, wherein the impressing elements have a greater hardness than the opposing one of the front face of the guide bar or bearing face of the brake carrier.

13. The disc brake according to claim 12, wherein the guide bar is hardened at least in the region of the impressing elements after formation of the impressing elements on the guide bar.

14. A disc brake for a utility vehicle, comprising:
a brake caliper configured to straddle a brake disc;
a guide bar configured to be connected to a brake carrier and displaceably support the brake caliper; and
a screw guided through the guide bar arranged to connect the guide bar to the brake carrier,
wherein
the guide bar has a projection configured to be received fixedly in a corresponding recess of the brake carrier such that a positively locking connection is formed by which the guide bar rotates with the brake carrier.

15. The disc brake according to claim 14, wherein a circumferential outer face of the guide bar projection and a circumferential inner face of the brake carrier recess is polygonal.

16. The disc brake according to claim 14, wherein a circumferential outer face of the guide bar projection and a circumferential inner face of the brake carrier recess are formed in a part-annular manner.

17. The disc brake according to claim 16, wherein a segment of the circumferential outer face of the projection and a segment of the circumferential inner face of the recess have a flattened shape.

18. The disc brake according to claim 14, wherein at least one part region of a circumferential outer face of the guide bar projection is formed in a part-annular manner and another part region of the circumferential outer face of the projection is formed in a flattened manner, and the projection is enclosed by an anti-rotation securing ring arranged on the brake carrier, the anti-rotation securing ring having a bore which extends parallel to the screw configured to receive a pin such that the pin extends into a corresponding bore in the brake carrier to secure the anti-rotation securing ring against rotation relative to the brake carrier.

19. The disc brake according to claim 16, wherein a segment of the circumferential outer face of the projection and a segment of the circumferential inner face of the recess of the brake carrier have a receptacle configured to receive a feather key.

20. The disc brake according to claim 14, wherein at least one part region of a circumferential outer face of the projection of the guide bar includes integrally formed impressing elements configured to engage into the brake carrier in an impressed manner such that at least one of a positively locking connection and a frictionally locking connection is formed between the guide bar and the brake carrier.

21. The disc brake according to claim 20, wherein the impressing elements are a knurled portion or a toothed portion.

22. A disc brake for a utility vehicle, comprising:
a brake caliper configured to straddle a brake disc;
a guide bar configured to be connected to a brake carrier and displaceably support the brake caliper; and
a screw guided through the guide bar arranged to connect the guide bar to the brake carrier,
wherein
an end face of the guide bar configured to bear against the brake carrier and a corresponding recess of the brake carrier are cone envelope-shaped, and
at least one of the guide bar and the screw is adhesively bonded to the brake carrier.

23. The disc brake according to claim 22, wherein the end face of the guide bar is configured to rise toward the screw.

24. The disc brake according to claim 22, wherein the end face of the guide bar is configured to fall toward the screw.

25. The disc brake according to claim 22, wherein the end face of the guide bar has a diamond spray coating.

26. The disc brake according to claim 1, wherein a sliding ring is arranged between a head of the screw and a supporting face in the guide bar.

27. The disc brake according to claim 1, wherein a bore in the guide bar configured to receive the screw is displaced eccentrically with respect to a rotational axis of the guide bar.

* * * * *